(12) United States Patent
Woodall

(10) Patent No.: US 8,421,921 B1
(45) Date of Patent: Apr. 16, 2013

(54) POST PROCESSING DISPLAYS WITH ON-SCREEN DISPLAYS

(75) Inventor: Neil D. Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 588 days.

(21) Appl. No.: 12/533,703

(22) Filed: Jul. 31, 2009

(51) Int. Cl.
*H04N 5/50* (2006.01)
*H04N 9/74* (2006.01)
*H04N 7/01* (2006.01)
*H04N 11/20* (2006.01)
*H04N 9/80* (2006.01)
*G09G 5/36* (2006.01)

(52) U.S. Cl.
USPC ........... 348/569; 348/588; 348/453; 345/560; 386/241

(58) Field of Classification Search ........................ None
See application file for complete search history.

(56) References Cited

U.S. PATENT DOCUMENTS

| | | | | |
|---|---|---|---|---|
| 5,091,786 A | * | 2/1992 | Miyaguchi | 348/588 |
| 6,529,244 B1 | * | 3/2003 | Hrusecky | 348/453 |
| 2006/0050076 A1 | * | 3/2006 | Jeong | 345/560 |
| 2010/0178038 A1 | * | 7/2010 | Ju | 386/109 |
| 2011/0181782 A1 | * | 7/2011 | Ha | 348/569 |

* cited by examiner

*Primary Examiner* — Jefferey Harold
*Assistant Examiner* — Sean Haiem
(74) *Attorney, Agent, or Firm* — Marger Johnson & McCollom PC

(57) ABSTRACT

An apparatus has at least one port to receive a data stream of image and on screen display data, an image processor to process the image data separate from the on screen display data and produced processed image data, and a display port to combine the on screen display data and the processed image data and transmit the combined data to a display. A method of processing on screen display data with an image post processor includes receiving a data stream from a video processor at a post processing device having at least one port, the data stream having both image data and on screen display data, separating the on screen display data from the image data, storing the image data and the on screen display data in separate areas of a memory, performing image processing on the image data with the post processor to produce processed image data, and transmitting the processed image data and the on screen display data through a display port.

21 Claims, 3 Drawing Sheets

POST PROCESSING DISPLAYS WITH ON-SCREEN DISPLAYS

BACKGROUND

On-screen displays (OSD) allow television and other display viewers to perform increasingly complex functions such as controlling settings for the television or display and menu selections for digital video recorders (DVRs) attached to the television. OSDs generally result from the video processor that operates the display. These video processors are typically highly integrated systems on a chip (SOC) and process input signals from a variety of sources for display by the television system, such as a flat panel or projector display.

The complexity of the SOCs makes them hard to program and software development times are becoming longer and more expensive. Manufacturers therefore tend to use the same SOC across all of their displays, leading to very little difference in image quality between the displays at the top and bottom of the product line.

The SOCs typically has only one output. This results in any post processing of the image after the SOC being applied to both the image and the OSD. When images are 'upscaled' or the frame rate is increased, this post processing actually degrades the appearance of the OSD. The one output also results in no post processing occurring if the OSD is to overlay the image. This may cause problems especially with 'transparent' OSDs, where the image can be seen 'through' the OSD.

DETAILED DESCRIPTION OF THE EMBODIMENTS

Video processors generally output the on screen display data as an overlay of the processed image data. Some display systems use post processors to perform more sophisticated image processing, generally for higher end systems, allowing the manufacturer to use the same video processor across all product lines but to provide extra processing for the higher end systems. The portions of the image data that lie under the on screen display generally cannot be processed as it causes artifacts in the on screen display.

One current solution uses a window to turn off the post processing in a region of the display, avoiding any degradation in the on screen display. Another approach uses a separate OSD input, which requires a re-programming of the video processor. It is generally desirable to avoid changing the OSD display design that results in the OSD data being included with the image data without any changes, while at the same time allowing more sophisticated processing algorithms to be applied to the image data for the entire image.

On screen displays have many uses, including control of the display system. A display system may consist of many different types of display systems, from flat panel televisions to computer monitors or any other device that displays video in a pixilated form. The term 'display' here will include any of these devices when used to refer to an output device that displays the video for a user to view.

The display system may have a system, or video, processor to process input signals from a variety of sources including a television signal tuner, a DVD or Blu-Ray® disc player, a VCR, a computer, a set top box, a cable converter, or even a flash memory device. This system processor will typically consist of a system-on-a-chip (SOC) having the tuner, various converters, amplifiers, memory and processing elements in a single integrated circuit.

Figure 1:
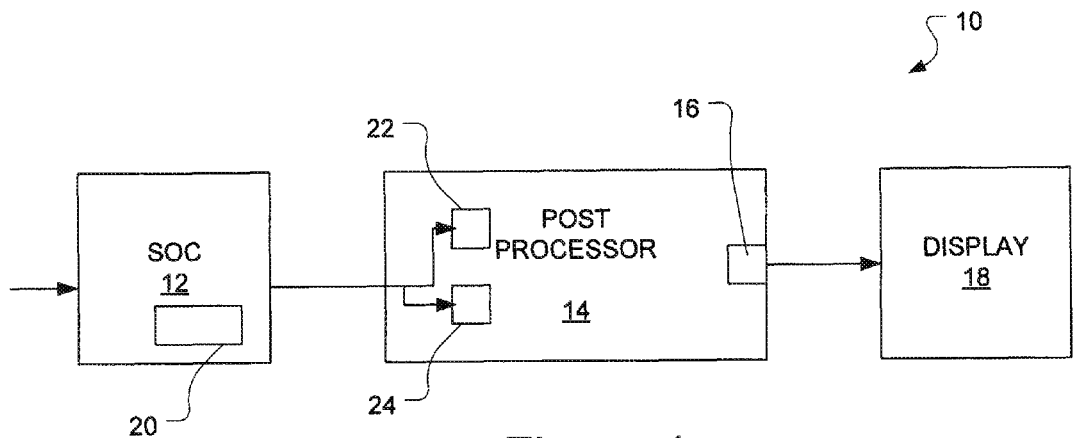
FIG. 1 shows an embodiment of a display system architecture.

FIG. 1 shows an architecture of a display system 10 having a SOC 12, a post or image processor 14 having a display port 16, and a display device 18. The SOC 12 receives a video input from one of a variety of sources. It then performs processing on the incoming video stream and includes OSD data as part of its output to the post processor 14, the process of which may involve the frame buffer controller 20. The post processor receives the data through one or more ports, shown here as ports 22 and 24. The post processor will process the image data for the entire image separate from the OSD, combine the data back together and then send it to the display 18 through the display port 16. The SOC may be referred to as a video processor, and the post processor may be referred to as an image processor.

Figure 2:
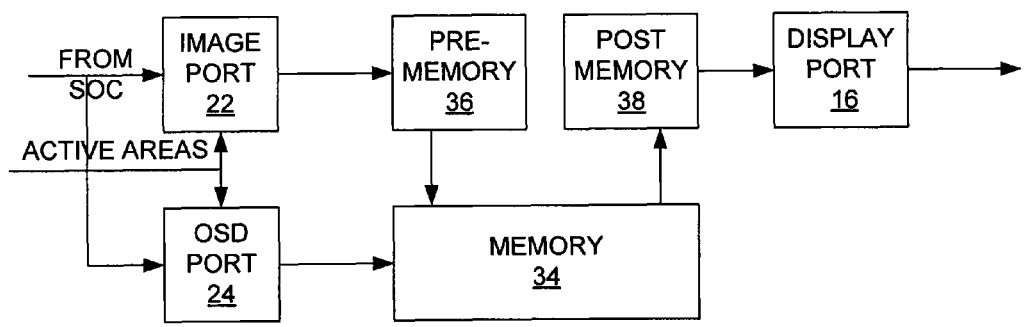
FIG. 2 shows an embodiment of an image post-processor.

FIG. 2 shows a more detailed view of an embodiment of a post processor such as 14 from FIG. 1. The post processor as shown here has two input ports, one port 22 for the image data and one port 24 for the on screen display data. In this instance, each input port will be programmed to capture a different area of the incoming data from the SOC. These ports may share the same connector, such as a package pin, and both may receive the same data stream including both the image data and the on screen display data.

Alternatively, the input to the post processor could be one port that switches between receiving the image data and the on screen display data or one port that captures both but stores them separately. The SOC may transmit the image data and the on screen display data in alternating frames, each frame consisting of fields of data interlaced to form a frame. For example, 1080i (1080 interlaced) signals have two fields of data, each 1920×540, to be combined together to form a 1920×1080 frame. A typical SOC would 'de-interlace' these fields to format them appropriately for a flat panel, pixilated display.

A simple change to the SOC software would bypass the final stages of de-interlacing and scaling and pass the raw fields onto the post processor. Doing so would result in the OSD data and the image data being transmitted to the post processor in alternating frames. In one embodiment, the port would switch between capturing the image data and the OSD data, storing each type separately.

In another embodiment, the port would capture both. When the image processor reads the data out of the memory, it reads only the image data. When the image processor overlays the OSD data, it would also read the portion of the memory that has the latest OSD data. This would be controlled by the frame buffer controller of the SOC, pointing to the appropriate data at the appropriate time.

The memory shown in the example of FIG. 2 is a frame memory 34. The post processor may store the OSD data and the image data in the same memory or in different memories, but for purposes of this discussion the same memory will be assumed. The memory may reside within the post processor or it may reside external to the post processor. The image data would then be processed at 36 and stored in memory then extracted from memory and further processed at 38. The processed image data and the OSD data are then recombined at the display port 16 and transmitted to the display.

In most cases, implementation of this post-processing device will involve bypassing the final deinterlacing and scaling portions of the video processor, a minor change to the operating software of the video processor. The SOC then transmits its output on one output.

The process of separating the OSD data from the image data will depend upon how the data is output from the SOC. One software change would result in the SOC sending out the OSD and the image data in alternating frames. Another would have the OSD data and the image data in the same frame, where the original image data would be smaller than the output frame. In this case, the SOC may need to communicate the location of the image data and the OSD data in the frame. However the OSD data and image data is output, they will be separated by the post processing device.

Figure 3:
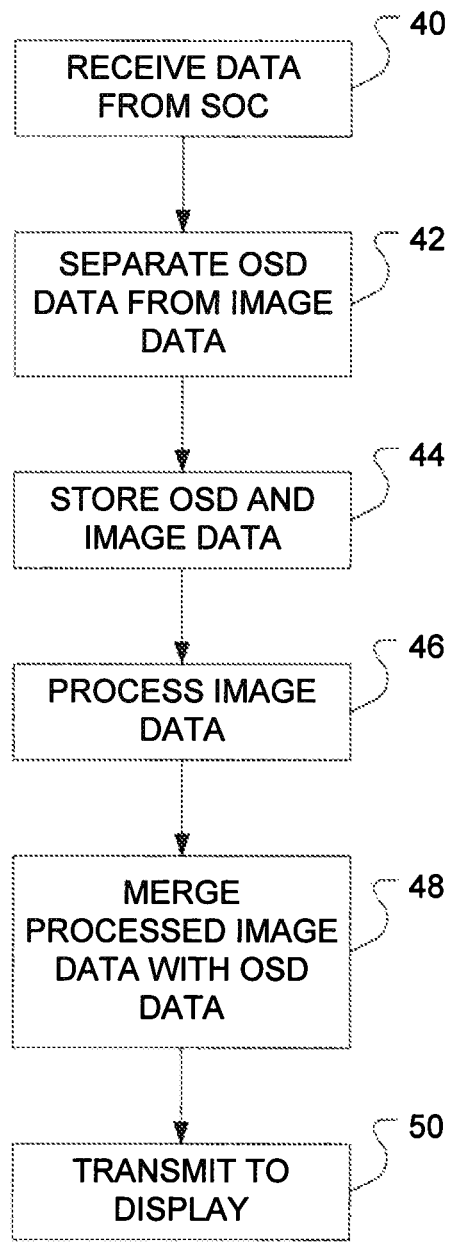
FIG. 3 shows a flowchart of an embodiment for processing and displaying on screen display data.

FIG. 3 shows an overview of an embodiment of a method to provide post processing of images in the presence of OSD data. The data stream containing the image data and the on screen display data is received as one data stream from the SOC at 40. The on screen display data and the image data are separated at 42, which may involve receiving a signal from the SOC as to the location of the two portions of data within the data stream. The OSD data and the image data are then stored separately at 44.

The image data undergoes processing at 46. One should note that the image data undergoing processing is the raw field/frame data of the entire image, not just those portions that do not lie under the OSD. This allows much more sophisticated algorithms that may use all of the image data to create clearer, sharper images.

If the raw field/frame data is passed to the post processor, the post processor will typically also perform frame conversion. Fields are received at a rate that is generally twice that of the frame rate. For NTSC, for example, fields are transmitted at 60 field per second, allowing a 30 frame per second rate. The raw incoming fields from the SOC would have to be converted to a frame rate to match the display.

In the case where the OSD data and the image data are in alternating frames, frame rate conversion may take the form of duplicating the image frame to achieve the proper frame rate (such as 30 fps). The frame rate to be achieved may depend upon the source frame rate, the 'original' frame rate. For 30 frames per second replication, each frame would be displayed twice. For 24 frames per second, each frame would be displayed twice, with every second frame displayed a third time, referred to as 3:2 pull down. With the post processor receiving the raw image data, it is the part of the system that performs this conversion, made a little more complicated by the alternating frames of OSD and image data.

An alternative approach from the replication of the image data to fill the frame rate above would be to interpolate the frames to fill the 'gaps' left by the alternating frames of OSD data. Frame interpolation is a process in which the data of two or more frames is used to arrive at an intermediate frame that would occur between them in time. If there is no motion between the two frames, the middle frame will be very much like either of the two 'outside' frames. If there is motion between the two frames, the frame data for the frame in between them would replicate that motion to be between the two positions shown in the outside frames. This would also be accomplished by the post processor.

In one embodiment, the OSD data may only be transmitted when it changes. In this case, the frames would only include an OSD frame when the change occurred. This results in the post processor only having to replicate frames when there is an OSD frame.

Once the image data is processed, it is merged back with the OSD data at 48. How the OSD appears on the display will depend largely upon how the SOC transmits the OSD data and the image data to the post processor to trigger the overlay. In one method would overlay the OSD on a background color. The background color would serve as a chroma key, as is used in blue and green screen processing, where any portion of the video that matches the chroma key is replaced with the overlay. If the full value of the chroma key is present, then the OSD would be transparent. If none of the value of the chroma key is present, then the OSD is opaque.

In another method, the OSD would be transmitted as an index color. The input port from the SOC will generally capture 3 channel (red, green and blue) color data. This would allow several bits to be reserved for an alpha blend channel. The alpha blend channel has information, usually stored as a 1 for opaque and a 0 for transparent, for each color. It would determine the amount of transparency for the OSD. In one embodiment, the alpha blend channel would be transmitted with the OSD data in the alternating frame format mentioned above. In another embodiment, the OSD alpha blend channel would be transmitted on a different frame than the OSD.

In another method, the OSD could be considered to be opaque or to have a fixed, predetermined level of transparency. In this method, the SOC may communicate with the post processor to turn the OSD overlay process on or off. This would result in the OSD either being present, from the viewer's perspective, or in it not being there at all. If the viewer provides an input, such as a programming request or a control input from a remote, the OSD would be on, for example. This method can be combined with the chroma key method to allow complex OSD shapes to be blended with the video Referring back to the post processing device diagram of FIG. 4, when the OSD is turned ON, the frame buffer controller would point to an area of the memory that has not data, only black. When the OSD is OFF, the SOC frame controller would point to the actual data.

Figure 4:
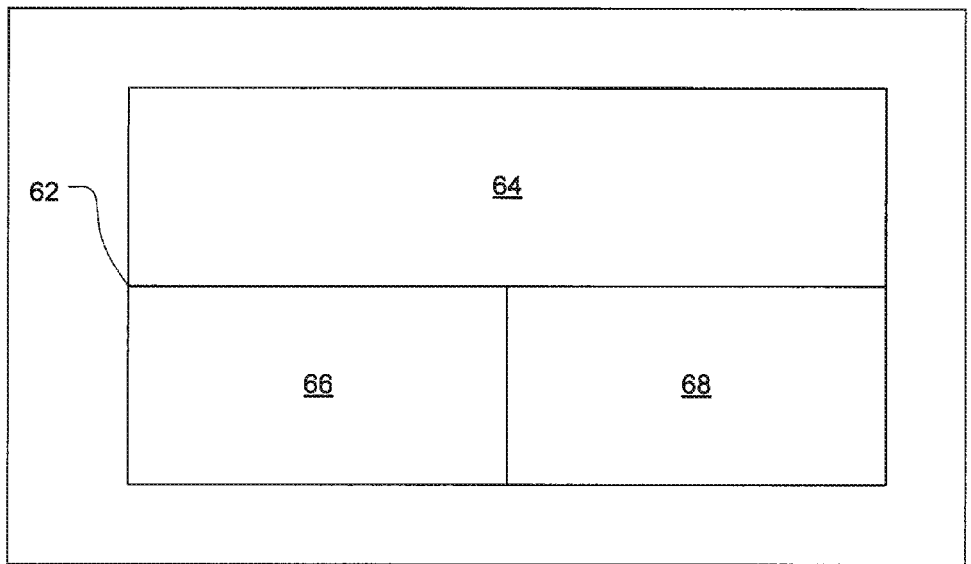
FIGS. 4 and 5 show embodiments of an on-screen display.

In addition to how the overlay is accomplished, it may also be possible to alter that format of the OSD using the techniques of this invention. FIG. 4 shows an example of a displayed image having an active area 62 of 1920×1080. The displayed area has an upper window 64 of 1920×540 for video images and two side-by-side OSD areas 66 and 68, each of 960×540. In some high resolution displays, the OSD is often stored as 960×540 and then upscaled to display, so this may allow them to be displayed in their 'native' format.

The above display assumes a 'standard' OSD window with 'standard' blanking intervals. The blanking intervals remain in many standards because of the need to accommodate cathode ray tube systems that need time to move the scanning guns back and forth and from the bottom of the screen back to the top. As flat panel, pixilated displays do not need this, the SOC software could be altered to provide for more lines for the OSD in conjunction with the overlay process, with the reservation that the processor clock rates should be maintained.

Figure 5:
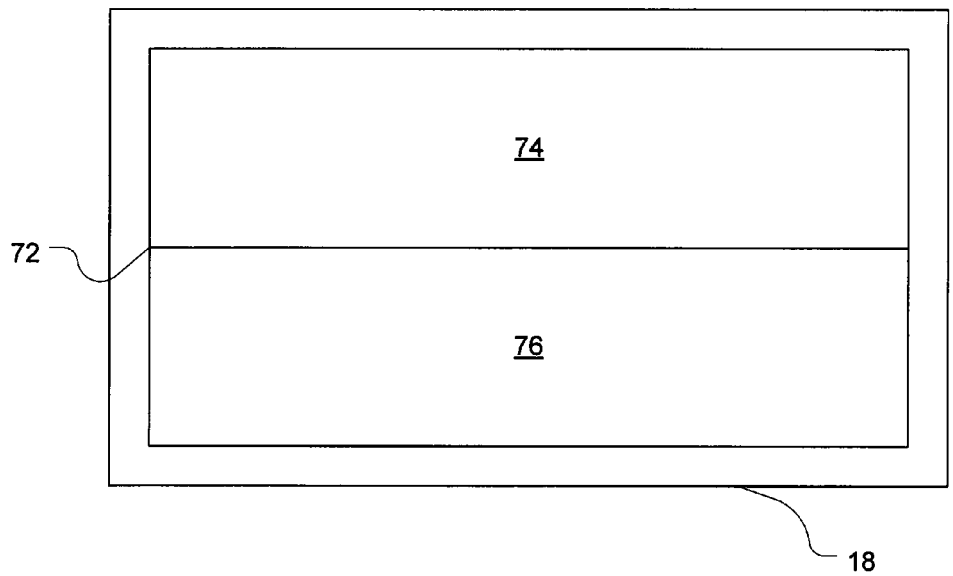

FIG. 5 shows an alternative OSD display 76 of 1920×744 lines instead of 540. This was accomplished by minimizing the horizontal and vertical blanking intervals to reduce the window 72 to 1924×1286, leaving the video display portion 74 on the upper part of the window at 1920×540. In the display of FIG. 4, the active area is 1920×1080 of a window of 2200×1125. The processor clock rate is 2200×1125×60 Hz, or 1.485 MHz. In the display of FIG. 5, the processor clock rate is 1924×1286×60 Hz, or 1.4845 MHz, allowing maintenance of the same processor clock rate.

Returning to FIG. 3, the merged data is then transmitted to the display device at 70. The merging and transmitting may both be accomplished at the same portion of the post processor, or may be performed by different portions. The transmission of the data to the post processor facilitates the ability to perform further processing on the image data, while allowing manipulation and alteration of the OSD data to effect various changes to the resulting OSD as displayed to the viewer.

Although there has been described to this point a particular embodiment for a method and apparatus for post processing of image data with OSD data, it is not intended that such specific references be considered as limitations upon the scope of this invention except in-so-far as set forth in the following claims.

What is claimed is:

1. An apparatus, comprising:
    at least one port to receive frames of data in the form of a combined data stream containing both image and on screen display data from a system processor;
    an image processor to separate the image data from the on screen display data and process the image data separate from the on screen display data and produced processed image data; and
    a display port to combine the on screen display data and the processed image data and transmit the combined data to a display.

2. The apparatus of claim 1, wherein at least one port comprises a first and a second port, both the first and second port arranged to receive the combined data stream, the first port to capture the display data and the second port to capture the on screen display data.

3. The apparatus of claim 2, wherein the first and second port share the same connector to a video processor.

4. The apparatus of claim 1, wherein at least one port comprises one port arranged to switch between capturing image data and capturing on screen display data.

5. The apparatus of claim 1, wherein at least one port comprises one port arranged to capture both image data and on screen display data.

6. The apparatus of claim 1, wherein the image processor is arranged to:
    read the image data from the memory;
    process the image data;
    access the memory to read the on screen display data; and
    overlay the on screen display data over the image data.

7. A display system, comprising:
    a video processor to produce a video output, the video output including combined image data and on-screen display data as frames of data;
    a post processing device, the post processing device comprising:
        at least one port arranged to receive the video output from the video processor and to separate the image data from the on-screen display data;
        an image processor to separate the image data from the on-screen display data and process the image data separate from the on-screen display data to produce processed image data;
        a memory arranged to receive and store the on screen display data; and
        a display port to transmit the processed image data and the on screen display data; and
    a display to receive and display the image data and the on screen display data.

8. The display system of claim 7, wherein the video processor resides on a system on a chip.

9. The display system of claim 7, wherein at least one port comprises two ports, both ports arranged to receive the video output, a first port to capture the image data from the video output and the second port to capture the on screen display data from the video output.

10. The display system of claim 7, wherein at least one port comprises one port.

11. The display system of claim 10, wherein the one port is arranged to switch between capturing the image data and the on screen display data.

12. The display system of claim 10, wherein the one port is arranged to capture both the image data and the on screen display data.

13. The display system of claim 10, further comprising a frame buffer controller arranged to point to the image data for the image processor for processing and to point to the on screen display data to overlay the on screen display data on the image data.

14. A method of processing on screen display data with an image post processor, comprising:
    receiving a combined data stream from a video processor at a post processing device having at least one port, the data stream having both image data and on screen display data in frames of data;
    separating the on screen display data from the image data;
    storing the image data and the on screen display data in separate areas of a memory;
    performing image processing on the image data separate from the on screen display data with the post processor to produce processed image data; and
    transmitting the processed image data and the on screen display data through a display port.

15. The method of claim 14, wherein receiving a data stream comprises receiving the image data and the on screen display data as separate frames.

16. The method of claim 15, wherein performing image processing on the image data includes performing frame rate conversion on the image data.

17. The method of claim 15, wherein performing frame rate conversion on the image data comprises one of replicating the image data for frame rate conversion or interpolating the image data for frame rate conversion.

18. The method of claim 17, wherein replicating the image data comprises replicating the image data to achieve one of either a 30 frame per second rate or a 24 frame per second rate.

19. The method of claim 14, wherein receiving the data stream comprises receiving a data stream containing on screen display data only when the on screen display data changes, and performing image processing comprises replicating frames of image data only as needed.

20. The method of claim 14, wherein receiving the data stream comprises receiving a data stream having the on screen display data and the image data in alternating frames, the frames containing the on screen display data also including an alpha blend channel.

21. The method of claim 14, wherein performing image processing includes merging the on screen display data with the processing image data to be displayed as one of either side-by-side or the on screen display data as an overlay of the image data.

* * * * *